United States Patent Office 3,715,325
Patented Feb. 6, 1973

3,715,325
INSOLUBLE POLYMERIC DIAZONIUM
SALT CHROMOGEN
Gianni Linoli, Lecco, and Enzo Sergio Mannucci, Siena, Italy, assignors to Miles Laboratories, Inc., Elkhart, Ind.
No Drawing. Continuation-in-part of applications Ser. No. 559,754, June 23, 1966, and Ser. No. 774,490, Nov. 8, 1968. This application Oct. 2, 1970, Ser. No. 77,742
Int. Cl. C08f 27/08
U.S. Cl. 260—2.2 R       7 Claims

ABSTRACT OF THE DISCLOSURE

A novel insoluble polymeric diazonium salt chromogen consisting of a diazotized aromatic polyamine bound by an amide linkage to a cation exchange resin can be prepared by reacting a cation exchange resin containing carboxylic acid groups or salts of such carboxylic acid groups with a halogenating agent to convert some of the resin carboxylic acid groups or salts of such acid groups to acyl halide groups, reacting the resulting acyl halide groups with an aromatic polyamine to form a resin containing amide linkages and free aromatic amino groups, and then diazotizing the free aromatic amino groups. The resulting insoluble chromogen can be used to detect coupling compounds by forming colored reaction products with such coupling compounds. This chromogen can also be used to detect enzyme activity wherein the enzyme catalyzes a reaction with a suitable substrate to release a coupling compound which will form a colored reaction product with the insoluble chromogen.

---

This application is a joint continuation-in-part of application Ser. No. 559,754, filed on June 23, 1966, now abandoned and application Ser. No. 774,490, filed Nov. 8, 1968, which issued as U.S. Pat. No. 3,616,251 on Oct. 26, 1971.

BACKGROUND AND OBJECTS OF THE INVENTION

It is known in the art that reactive coupling compounds, such as phenols, aromatic amines or compounds containing active methylene or active methyl groups can form colored reaction products upon reaction with an aromatic diazonium salt. When the technique is employed, however, as a means of quantitatively detecting such coupling compounds, there are many difficulties presented. The reaction is usually carried out in a liquid medium. If the diazonium salt is added to the liquid sample, the intensity of the color developed by the reaction between the coupling compound and the prior art diazonium salt is an inaccurate measure of the concentration of the coupling compound, since the diazonium salt becomes diluted by the liquid medium and causes a dilution of the developed color intensity. If the prior art diazonium salt is impregnated in a carrier medium, such as a strip of bibulous material, and the carrier is contacted by a solution of the coupling compound, the resulting color intensity is not an accurate measurement of the concentration of the coupling compound, since the liquid sample washes some of the soluble diazonium salt out of the carrier.

Complex instrumental methods have also been developed for this prior art analytical procedure, but they are costly and require highly skilled personnel to operate.

It has been suggested in the prior art that an insoluble diazonium salt could be prepared by nitrating benzenoid units of a polymer, such as polystyrene, followed by reduction of the resulting nitro groups to amino groups and then by diazotization of such amino groups. This prior technique is not satisfactory, however, for production of analytical tools since the nitration step, which involves the use of an oxidizing agent, causes an undesirable discoloration of the polymer products which does not disappear completely upon reduction and subsequent diazotization. This discoloration interferes with any subsequent colors produced by reaction of the insoluble diazonium salt with a coupling compound.

It is an object of the present invention to produce insoluble diazonium salts free of undesirable coloration.

It is another object of the present invention to provide a process for producing such insoluble diazonium salts.

It is a further object of the present invention to provide an improved process for determining reactive coupling compounds which involves none of the shortcomings of the prior art.

It is still another object of the present invention to provide an improved process for determining enzyme activity which involves none of the shortcomings of the prior art.

It is another object of this invention to provide such a process which is convenient to use and which does not require a high level of training and skill in the operation of analytical instruments or the carrying out of complex chemical recations.

Another object of this invention is to provide an improved process as aforedescribed by the practice of which the above mentioned determination can be made in a very short time and without special equipment.

Another object of this invention is to provide a process for determining reactive coupling compounds when they are present in very low concentrations.

SUMMARY OF THE INVENTION

In accordance with the invention, an insoluble polymeric diazonium salt chromogen is provided consisting essentially of an insoluble cation exchange polymeric resin having reactive groups selected from the class consisting of carboxylic acid groups, potassium salts of such acid groups, and sodium salts of such acid groups attached to the resin and where a predetermined number of the reactive groups are each individually bonded through an acyl-amide linkage to the diazotized form of a carbocyclic aromatic diamine moiety derived from a compound selected from the class consisting of benzidene, o-tolidine, o-dianisidine, phenylenediamine and 2-choloro-1,4-diaminobenzene.

The invention also relates to a process of producing such insoluble polymeric diazonium salt chromogen and the use of such chromogen to detect coupling compounds and enzyme activity.

DESCRIPTION OF THE INVENTION

The insoluble polymeric diazonium salt chromogens of the present invention are produced from cation exchange resins containing carboxylic acid reactive groups. These materials are well-known and are available commercially from several sources. Amberlite IRC 50, Amberlite CG 50 and Amberlite IRP 64 are marketed by the Rohm & Haas Co. and consist of copolymerized methacrylic acid and divinylbenzene with carboxylic acid reactive groups. Equivalent resins are Duolite CS–101 marketed by the Chemical Process Co. and Permutit H–70 marketed by the Permutit Co. Amberlite IRC–84 and Amberlite XE–222 marketed by the Rohm & Haas Co. consist of copolymerized acrylic acid and divinylbenzene with carboxylic acid reactive groups. The sodium or potassium salts of these cation exchange resins are prepared in the well-known manner of contacting such resins with sodium hydroxide or potassium hydroxide, for example.

The above cation exchange resins are then halogenated to form resins having acyl halide reactive groups, the resins are then reacted with a carbocyclic aromatic diamine to form resins having reactive groups individually bonded through an acyl-amide linkage to a carbocyclic aromatic diamine moiety having a free amino group, and the free amino groups are then diazotized to form the desired product.

The insoluble chromogens of present invention have a controlled amount of "coupling power" for subsequent reaction with coupling compounds to form colors. The coupling power is a measure of the number of diazo groups on the resin that are capable of reacting with a coupling compound. This controlled coupling power enables the sensitivity of the chromogens toward specific coupling compounds to be predetermined. This is also useful in controlling the sensitivity of the chromogens in the determination of the activity of specific enzymes. The insoluble chromogens of the present invention have a coupling power of from 4.25 to about 350 milligrams of naphthol per gram of chromogen. The methods for measuring this coupling power are set forth below.

The controlled coupling power is primarily obtained by halogenating only a predetermined number of the acyl reactive groups on the cation exchange resin. This predetermined number of acyl halide groups predetermines the amount of carbocyclic aromatic diamine that is capable of being bonded to the resin through an acyl-amide linkage and thus also predetermines the number of free amino groups bonded to the resin that are capable of being diazotized. The halogenated resin should contain from 0.2 to 2.37 milliequivalents of acyl halide per gram of resin.

Halogenation of the cation exchange resins is conveniently carried out by reacting the carboxylic acid groups of the resin with a halogenating agent, such as thionyl chloride ($SOCl_2$), thionyl bromide ($SOBr_2$), thionyl fluoride ($SOF_2$), phosphorus trichloride ($PCl_3$), phosphorus pentachloride ($PCl_5$), phosphorus tribromide ($PBr_3$), phosphorus trifluoride ($PF_3$), phosphorus pentafluoride ($PF_5$), phosphorus triiodide ($PI_3$), and the like. Sodium or potassium salts of such carboxylic acid groups are halogenated by halogenating agents, such as sulfuryl chloride ($SO_2Cl_2$), sulfuryl fluoride ($SO_2F_2$), phosphorus oxychloride ($POCl_3$), phosphorus oxybromide ($POBr_3$), phosphorus oxyfluoride ($POF_3$), and the like. For example, in the case of a cation exchange resin having carboxylic acid reactive groups, reaction with thionyl chloride produces the acyl chloride of the resin as shown in the following equation:

$$\text{Resin—COOH} \xrightarrow{SOCl_2} \text{Resin—COCl}$$

As mentioned above, it is desirable to have a predetermined amount of halogenation of the resin. The amount of halogenation can be primarily controlled by regulating the reaction time between the resin and the halogenating agent. The following table shows representative amounts of chlorination of a resin obtained by thionyl chloride for various reaction times at 90° C.

| Reaction time, hr.: | Milliequivalents of acyl chlorine per gram of resin |
|---|---|
| 1 | 0.25 |
| 2 | 0.45 |
| 3 | 0.65 |
| 4 | 0.8 |
| 5 | 0.9 |
| 6 | 1.0 |
| 7 | 1.1 |
| 8 | 1.2 |
| 9 | 1.3 |
| 10 | 1.35 |
| 15 | 1.5 |

It has been found that direct chlorination with thionyl chloride, for example, can achieve a maximum of about 1.5 meq. chlorine per gram of resin. There is often a variation in the amount of chlorination achieved under these conditions. In order to achieve more reproducible chlorination results and also to achieve higher amounts of chlorination, it is preferred to control the degree of hydration of the resin prior to chlorination. It has been found that chlorination is reproducibly related to the amount of water present in the resin at the time of chlorination. The following table shows representative amounts of chlorination of a resin obtained by thionyl chloride at 80° C. for 6 hours for various amounts of resin water content.

| Water content ml./ gm. resin: | Meq. acyl chlorine/gm. resin |
|---|---|
| 0.04 | 0.2 |
| 0.08 | 0.28 |
| 0.12 | 0.35 |
| 0.16 | 0.65 |
| 0.20 | 1.4 |
| 0.24 | 1.65 |
| 0.30 | 1.7 |

The resin should thus contain from 0.04 to 0.30 milliliters of water per gram of resin prior to reacting the resin with a halogenating agent.

The halogenated resin containing a predetermined number of acyl halide groups is then reacted with a carbocyclic aromatic diamine selected from the class consisting of benzidine, o-tolidine, o-dianisidine, phenylenediamine and 2-chloro-1,4-diaminobenzene. The reaction takes place in water or in an organic solvent, such as toluene or dimethylformamide. If an acid salt of the diamine is employed, such as an amine sulfate, it is desirable to add triethylamine to the liquid medium to react with the acid liberated from the salt. A reaction temperature of about 0° C. to 5° C. is used with a water medium with a reaction time of about 12 to 14 hours, and a reaction temperature of about 50° C. to 85° C. is used with an organic solvent with a reaction time of about 0.5 to 14 hours.

It is of course recognized that some control over the coupling power of the final product composition can be obtained by controlling the amount of reaction that takes place between the halogenated resin and the diamine. In general, the longer the reaction time, the more complete will be the reaction.

The amidation reaction between the acyl halide groups of the resin and the carboxylic aromatic diamine is shown in the following equation wherein "Ar" represents the aromatic nucleus to which the two amino groups are attached.

$$\text{Resin—COCl} + NH_2\text{—Ar—}NH_2 \rightarrow$$
$$\text{Resin—CO—NH—Ar—}NH_2 \cdot HCl$$

The amidated resin produced by the above reaction wherein a diamine moiety having a free amino group is attached through an acyl-amide linkage to a cation exchange resin is then treated by well-known techniques to diazotize the free amino groups and form diazonium salts.

The diazotization is performed, for example, by reacting the resin amide with sodium nitrite in the presence of an acid, such as hydrochloric, sulfuric, phosphoric or fluoboric acid, resulting in the formation of a polymeric diazonium salt. The reaction temperature is from about 0° C. to about 40° C. with a reaction time from about 5 minutes to about 4 hours. This reaction is shown by the following equation:

$$\text{Resin—CO—NH—Ar—}NH_2 \xrightarrow[HBF_4]{NaNO_2} \text{Resin—CO—NH—Ar—}N^{\oplus}{\equiv}NBF_4^{\ominus}$$

The insoluble polymeric diazonium salt chromogens produced in accordance with the present invention are hydrophilic, insoluble in aqueous and organic liquid systems and are quite stable for extended storage periods because of the presence in the resins of unreacted carboxylic acid groups.

These polymeric diazonium salt chromogens are useful to form colors upon reaction with coupling compounds, such as phenols, naphthols, aromatic amines, naphthoic acid derivatives, nitro derivatives of amines and phenols, nitro-paraffins, componnds containing active methylene or active methyl groups, such as acetoacetic esters, beta-oxoglutaric acid or 5-pyrazolone derivatives, sulfonic acid derivatives of phenol and naphthol and sulfonic acid derivatives of aromatic amines. This color formation can be used to qualitatively and quantitatively determine such coupling compounds. The chromogens of the present invention have the advantage of being insoluble and thus the colors developed are not diluted by or washed away by any liquid medium being used to determine the presence of coupling compounds.

The color forming coupling reaction between the insoluble polymeric diazonium salt chromogen and a coupling compound, such as alpha naphthol, is shown by the following equation:

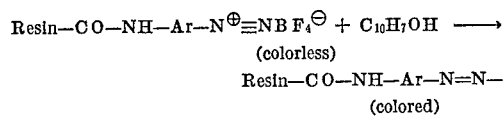

The coupling reaction to form the colored azo compound is generally a quantitative one; that is, a certain amount of polymeric diazonium salt having a certain coupling power will react with a fixed amount of a coupling compound under suitable conditions. The coupling power of a resin diazonium salt can be measured by either of the following two methods.

METHOD A

A buffer solution is prepared by dissolving 10 g. of tris (hydroxymethylamino)methane in 50 ml. of water. The pH is brought to 8.5 by adding sufficient amount of 5 N hydrochloric acid. The total volume is diluted to 100 ml. with water. A quantity of 2 weight percent solution of alpha naphthol in ethyl alcohol is added to the above buffer solution in an amount such that there will be about 50% excess of alpha naphthol over that required to react with the sample of diazonium salt. This mixture is called the work solution. In a dark glass beaker, 100 mg. of the insoluble polymeric diazonium salt chromogen are added to 5 ml. of the above work solution. The resulting suspension is stirred for twelve minutes and then diluted to 50 ml. with 10 weight percent aqueous acetic acid and filtered. The filtrate is diluted with water so as to obtain a naphthol concentration of about 20 micrograms per ml. A standard solution is also used which has been diluted in the same way without coming into contact with the resin. The optical density of the sample solution and of the standard solution are measured at a wavelength of 284 millimicrons. The coupling power (C.P.) is then calculated by the following formula:

$$C.P. = A - \left(A \times \frac{D'}{D}\right)(0.01)$$

wherein

A = micrograms of naphthol added
D' = optical density of sample
D = optical density of standard The resulting coupling power is expressed as milligrams of naphthol fixed per gram of resin diazonium salt. If beta naphthol is employed, the optical density is measured at 274 millimicrons wavelength.

METHOD B

The apparatus and general procedure employed in this method are described in Analytical Chemistry, vol. 31, No. 2, pp. 204–6 (1959). An exactly weighed sample of the insoluble polymeric diazonium salt chromogen (about 0.2–0.5 g.) is placed in the reaction flask. The system is purged with carbon dioxide and the carbon dioxide flow through the system is adjusted until microbubbles are entering the nitrometer. The level of potassium hydroxide solution in the nitrometer is adjusted to the "zero" volume mark by raising the leveling bulb. The carbon dioxide flow rate is then adjusted to 120 microbubbles per minute. The leveling bulb is then lowered. The time is noted and 2 g. of cuprous chloride in 10 ml. of conc. hydrochloric acid is introduced to the reaction flask followed by the introduction of 10 ml. of water. The resulting suspension is heated by a microburner so that a steady flow of gas passes into the nitrometer. Completion of reaction is indicated by reduction of gas flow into the nitrometer to microbubbles. The time is then noted and the leveling bulb is raised to the height of the meniscus of the liquid in the nitrometer, and the volume of gas is recorded. The temperature at the nitrometer, the barometric pressure and the total elapsed reaction time is noted. A blank is determined on an equal volume of reagents in exactly the same manner and for an identical time period. The coupling power of the chromogen is then calculated by the following formula:

$$C.P. = \frac{P(V-V_o)(273)(144,000)}{(760)(T+273)(22,400)A}$$

wherein

V = volume of gas in nitrometer, ml.
$V_o$ = volume of gas in blank, ml.
P = atmospheric pressure reduced by the pressure of the 50% potassium hydroxide solution in the nitrometer, mm. mercury.
TT = temperature at nitrometer, ° C.
A = grams of chromogen The coupling power is expressed as milligrams of naphthol fixed per gram of insoluble polymeric diazonium salt chromogen.

These insoluble chromogens are particularly useful when employed in reagent strips. In one form the insoluble chromogen is coated upon sheets of a bibulous cellulosic material, such as filter paper, to provide sheets containing zones of insoluble chromogen.

Rather than merely coating cellulosic sheets, an especially convenient and elegant method involves the formation of fibrous chromogen sheets from an aqueous homogenized mixture of insoluble chromogen and cellulosic fibrous material. These fibrous chromogen sheets are then used to prepare strips or discs having chromogenic properties.

The insoluble chromogens of this invention are also useful in the form of tablets which are prepared by mixing the insoluble chromogen with suitable tabletting materials, such as powdered cellulose and the like.

Strips can be either of a continuous or discontinuous type; that is, the areas containing chromogen may be continuous or alternated with inert areas. For instance, continuous strips can be formed by a whole reactive zone fixed to a support, such as paper, cardboard, wood, glass fiber or plastic. Graduated scales referring to quantities of the product to be determined can be imprinted upon such support. In the discontinuous type, the reactive zones are alternated with non-reactive zones.

For testing, when strips are used, an ascending or descending chromatographic technique is adopted. A predetermined amount of solution to be tested for the coupling compound is absorbed into one end of the strips and the strips are then washed with water. The coupling compound, in contact with the insoluble chromogen, generates a color. Since the coupling reaction is a quantitative one, the color intensity will be determined by the chemical composition of the reactive area, that is, by the amount of insoluble chromogen present in the strip, while the extension of the colored area, measured by means of the previously mentioned imprinted graduations, will be proportional to the amount of the coupling compound coming into contact with the reactive zone.

Coupling compound concentration can be determined in the one zone continuous strip by means of the previously mentioned imprinted graduations. In the discontinuous type multiple zone strip the number of the zones in which a color is developed will indicate the concentration of the coupling compound being determined. For example, by using a series of three zones containing the chromogen fixed to a bibulous carrier, it is possible to determine the amount of coupling compound present in a predetermined amount of sample by the extent to which the advancing solvent front of the test medium carries the coupling compound along the strip. That is, a lesser concentration of coupling compound may react with the chromogen present in the first zone but not with that present in the second or third zone. A somewhat higher concentration may react with that present in the first two zones and a still higher concentration with that present in all three zones.

When discs are used, a predetermined amount of the liquid under examination is absorbed into the disc. The reaction between the chromogen and any coupling compound present takes place in the disc and a color, the intensity of which is proportional to the amount of coupling compound present, is developed. The color obtained is compared with a suitable color chart and the amount of coupling compound present in the solution under examination is determined. Tablets are used in a similar manner.

In addition to using the insoluble chromogen of this invention to detect reactive coupling compounds, it is also possible to detect enzymatic activity which is capable of producing reactive coupling compounds. Since a wide variety of enzyme activities are capable of catalyzing the liberation of coupling compounds by their precursors, the presence of such enzyme activities can be readily detected by using the insoluble chromogen of this invention together with an appropriate coupling compound precursor as a substrate for the enzyme to be detected. Representative examples of these enzymatic reactions are the following:

(a) Lipase: The substrate used can be naphthyl laurate, myristate or caprylate. Lipase hydrolyses the substrate liberating the naphthol which is the specific compound to be determined.

(b) Acetyl esterase: The substrate used can be acetyl naphthol. The enzymatic hydrolysis liberates naphthol which is a reactive coupling compound.

(c) N-acetylbetaglucosaminidase: Using as substrate naphthyl - β - acetylglucosamine the enzymatic reaction releases naphthol.

(d) Glutamic-oxalacetic transaminase (GOT): In GOT transaminations oxalacetic acid is formed from L-aspartate plus alpha-ketoglutarate. The oxalacetic acid formed in this reaction can be determined by means of the insoluble chromogens of this invention because its active methylene group reacts with diazonium salts.

(e) Leucine aminopeptidase: Using L-leucy - β - naphthylamide as a substrate, the enzymatic reaction liberates β-naphthylamine.

(f) Acid and alkaline phosphatases: The various phosphatases catalyze the hydrolysis of aromatic phosphates to the corresponding aromatic hydroxyl compounds which can then be readily detected by means of the chromogens of this invention.

(g) Oxytocinase; using as substrate cystein-meta-anisidide the enzymatic reaction releases meta-anisidine.

(h) Gamma-glutamyl-transpeptidase; using as substrate gamma-L-glutamic-meta-anisidide the enzymatic reaction releases meta-anisidine.

Many convenient methods can be used for detecting these systems having enzymatic activities. For example, a suitable substrate for such enzyme system, such as an aromatic phosphate, can be impregnated into one zone of a bibulous carrier having a contiguous zone incorporating a chromogen. When the substrate zone is moistened with a solution containing an enzyme, such as a phosphatase, the enzymatic reaction proceeds, resulting in the release of an aromatic hydroxyl compound. Washing with water brings the latter into contact with the insoluble chromogen in the adjacent zone giving a color.

Another convenient method of using the insoluble chromogen of this invention for the detection of an enzyme system provides the enzyme substrate in a tablet form which is added to the solution which is being tested for the presence of the enzyme. The chromogen in the form of a bibulous strip or tablet is then moistened with the resulting solution to cause the desired color reaction to occur if the enzyme is present. Such a test method is convenient, for example, for testing milk for the presence of phosphatases in order to check the pasteurization. It is well known that pasteurization temporarily destroys phosphatase in milk and that the presence of phosphatase in pasteurized milk soon after pasteurization is a sign of inadequate pasteurizing temperature or of the presence of raw milk.

It has been found preferable that the insoluble polymeric diazonium salt chromogen useful for the detection and determination of alkaline phosphatase should have a coupling power of from about 25 to about 45 milligrams of naphthol per gram of chromogen. If the coupling power is below about 25, there are insufficient diazonium groups to react with all the coupling compound liberated by high concentrations of alkaline phosphatase. Any quantitative determination based thereon may therefore be in error. If the coupling power is above about 45, the reaction with the coupling compound produces dark colors which prevent the quantitative detection of low concentrations of the enzyme.

It has also been found preferable that the insoluble polymeric diazonium salt chromogen useful for the detection and determination of glutamic-oxalacetic transaminase should have a coupling power of from about 190 to about 350 milligrams of naphthol per gram of chromogen. The oxalacetic acid coupling compound liberated by this enzyme has weak reactivity, and for this reason a strong coupling power is needed. There is insufficient reactivity of the chromogen at a coupling power below about 190 to provide a satisfactory test. There is no practical advantage in using a coupling power above about 350. The determination of glutamic-oxalacetic transaminase activity in human serum is helpful in the diagnosis of myocardial infarct and in some hepatic diseases.

This invention will be better understood by reference to the following examples which are intended as illustrative of the inventive concept and are not to be construed so as to limit the scope of the invention which is defined in the claims appended hereto.

EXAMPLE 1

A polymethacrylic acid-divinylbenzene cation exchange resin containing about 8 weight percent divinylbenzene in the resin polymer (Amberlite IRP 64 type), in the carboxylic acid form, was milled into a fine powder (particle size varying in the range of 20–50 microns) and dried. Fifty grams (50 g.) of the obtained powder were refluxed in 200 ml. of thionyl chloride under stirring for 6 hours. The reaction mixture was then filtered and the resulting chlorinated resin washed with anhydrous toluene and dried in high vacuum. The so obtained chlorinated resin contained 0.98 meq. of —COCl per gram.

EXAMPLE 2

The above mentioned fine form of resin, having a particle size of 20–50 microns, was chlorinated under the same conditions for 3 hours. The resulting chlorinated resin contained 0.66 meq. —COCl per gram.

EXAMPLE 3

The already mentioned fine form of resin, having a particle size of 20–50 microns, was chlorinated under the same conditions for 9 hours and the resin contained 1.4 meq. —COCl per gram.

EXAMPLE 4

The resin of Example 1 was reduced by milling to a fine powder (particle size 1–5 microns) and then dried. Chlorination took place according to the procedure indicated in Example 1 for 3 hours. The resulting chlorinated resin contained 0.84 meq. —COCl per gram.

EXAMPLE 5

The resin of Example 1 was changed into the sodium salt by treatment with sodium hydroxide and reduced by milling to a fine powder (particle size varying from 50 ot 70 microns) and then dried. A 50 g. quantity of the resin sodium salt was refluxed for 6 hours in 100 ml. of anhydrous carbon tetrachloride and 100 ml. of sulfuryl chloride. The resin was filtered and washed with carbon tetrachloride and then dried. The resulting chlorinated resin contained 0.56 meq. of —COCl per gram.

EXAMPLE 6

A 10 g. quantity of chlorinated resin prepared according to the procedure of Example 1 was poured into a solution of o-dianisidine (3.6 g.) in 75 ml. of dry toluene. The resulting suspension was heated at 85° C. for 5 hours with stirring. The mixture was filtered and the resin was washed with ethanol (100 ml.) from which the unreacted amine was recovered. The resin was then put into a chromatographic column and washed with 2 N HBF$_4$ (200 ml.) and then with water until the effluent liquid was neutral. The resulting resin containing acylated amine, analyzed for diazotizable nitrogen, had 47 mg. of mono-linked o-dianisidine per gram.

EXAMPLE 7

A 10 g. quantity of chlorinated resin prepared according to Example 1 was poured into a solution of o-dianisidine (3.6 g.) and triethylamine (10 g.) in 75 ml. of dry toluene. The resulting suspension was heated at 85° C. for 6 hours with stirring. The resin was washed according to Example 6 and then dried. The resulting resin containing acylated amine, analyzed for diazotizable nitrogen, had 61 mg. of mono-linked o-dianisidine per gram.

EXAMPLE 8

A solution of o-dianisidine dihydrochloride (4.3 g.) in 200 ml. of water was refrigerated at a temperature of 0.5° C. To this solution a 10 g. quantity of the chlorinated resin from Example 1 was added. Stirring and refrigeration were continued while 30 ml. of 20% NoOH was slowly added up to a pH value of 11–12. After 14 hours of stirring and refrigerating, the suspension was centrifuged and the precipitate washed with methanol. The washings were saved for the subsequent recovery of unreacted amine. The resin was then washed with HBF$_4$ and dried according to Example 6. The resulting resin containing acylated amine, analyzed for diazotizable nitrogen, had 7.20 mg. of mono-linked o-dianisidine per gram.

EXAMPLE 9

A solution of m-phenylenediamine·2HCl (2.66 g.) in 50 ml. of water was refrigerated at a temperature of 0–5° C. To this solution a 10 g. quantity of the chlorinated resin prepared as in Example 1 was added and 24 ml. of 20% NaOH were slowly added up to a pH value of 11–12, while the mixture was stirred and refrigerated. After 14 hours, the resin was filtered off and washed according to Example 8. When analyzed, the resulting resin containing acylated amine had 15.9 mg. of mono-linked m-phenylene-diamine per gram.

EXAMPLE 10

A 10 g. quantity of chlorinated resin prepared according to Example 3 was poured into a solution of o-dianisidine (5.25 g.) in 75 ml. of dry toluene heated to 80° C. The obtained suspension was heated to 80° C. for 14 hours. The suspension was then filtered and the resulting resin washed as in Example 8. The resin containing acylated amine so obtained had 63 mg. of mono-linked o-dianisidine per gram.

EXAMPLE 11

A 10 g. quantity of chlorinated resin obtained as in Example 3 and a 5.95 g. quantity of o-tolidine dihydrochloride were reacted according to the conditions of Example 9. The resulting resin containing acylated amine had 11.8 mg. of mono-linked o-tolidine per gram.

EXAMPLE 12

A 10 g. quantity of chlorinated resin obtained as in Example 3 and a 5.3 g. amount of benzidine dihydrochloride were reacted according to the conditions in Example 9. The resulting resin containing acylated amine had 45 mg. of mono-linked benzidine per gram.

EXAMPLE 13

A 3 g. quantity of the resin containing acylated amine of Example 6 was suspended in 10 ml. of 3 N HBF$_4$ and cooled at a temperature of 0–5° C. The resulting suspension was stirred while adding dropwise 10 ml. of 1 N NaNO$_2$. Stirring was continued and the temperature maintained for 4 hours. The mixture was then centrifuged, and the isolated insoluble polymeric diazonium salt then centrifuged, and the isolated insoluble polymeric diazonium salt chromogen

was dried in a vacuum. This procedure was then extended to all resin containing acylated amines prepared according to the Examples 6–12.

EXAMPLE 14

The various insoluble polymeric diazonium salt chromogens were reacted with α-naphthol in order to determine the coupling power and to observe the developed color. The results using insoluble chromogens prepared from each of the resin containing acylated amines of Examples 6–12 are shown in Table 1. Method A was employed to measure the coupling power.

TABLE 1

| Example: | Amine resin type | Coupling power, mg. naphthol/g. resin | Color developed |
|---|---|---|---|
| 6 | Resin-o-dianisidine | 27.8 | Medium purple-red. |
| 7 | do | 36.0 | Deep purple-red. |
| 8 | do | 4.25 | Light purple. |
| 9 | Resin-m-phenylenediamine | 21.4 | Orange. |
| 10 | Resin-o-dianisidine | 37.0 | Medium purple-red. |
| 11 | Resin-o-tolidine | 8.1 | Red |
| 12 | Resin benzidine | 35.6 | Brick red. |

EXAMPLE 15

A mixture of 8 g. of cellulose fiber (cut to a length of about 3 mm.) and 2 g. of

from Example 13 was homogenized in 5 liters of water at pH 3–4. The homogenized mixture was allowed to settle, and the cellulose resin layer which formed was pressed into a 25 cm. sheet, which possessed a diazo-coupling power equal to ⅕ that of the original insoluble chromogen.

EXAMPLE 16

Sheet material as per Example 15 was cut into strips 0.5 cm. wide and likewise non-reactive strips of the same size of Eaton-Dikeman 6257-65 filter paper were prepared. The strips of the 2 different types of paper were attached longitudinally with glue to a plastic waterproof support (about 3.5 cm. wide) in order to obtain a sheet having side-by-side 3 reactive zones alternating with 2 non-reactive zones. Along the edges of the sheet were placed 2 strips of filter paper 3 cm. wide which both extended beyond the edges of the plastic support. The resulting sheet was cut transversely into strips each 0.5 cm. wide. Such strips consisted of a 3 cm. portion of filter paper, 0.5 cm. portions of reactive, non-reactive, reactive, non-reactive and reactive zones followed by a 3 cm. portion of filter paper.

EXAMPLE 17

The sheet prepared according to the procedure of Example 15 was cut into 3 mm. x 30 mm. strips. These were each glued longitudinally to a separate plastic waterproof support adjacent to a graduated scale with consecutive numbers from 0 to 10 each spaced 3 mm. apart. At the top and bottom part of the support 2 strips of 3 mm. x 30 mm. filter paper were fixed coaxial with and in contact with the above strip.

EXAMPLE 18

Strips were prepared according to Examples 16 and 17 except that one 3 cm. filter paper end was replaced with glass fiber paper. This glass fiber end was dipped into a substrate solution having the composition (per ml. of aqueous solution) shown in Table 2.

Table 2

| Ingredient: | Weight, mg. |
|---|---|
| Tris(hydroxymethyl)aminomethane | 200 |
| Sodium β- or α-naphthyl phosphate | 20 |
| Magnesium sulphate | 0.5 |
| pH=10.3. | |

The wet strips were dried in a vacuum.

EXAMPLE 19

The procedure of Example 18 was followed except that the composition shown in Table 3 was used.

Table 3

| Ingredient: | Weight, mg. |
|---|---|
| Sodium fumarate | 100 |
| Sodium β- or α-naphthyl phosphate | 20 |
| Magnesium sulphate | 0.5 |
| pH=5.05. | |

EXAMPLE 20

The sheet prepared according to Example 15 was glued to a plastic support and cut into disc form.

EXAMPLE 21

Tablets were prepared containing the ingredients shown in Table 4.

Table 4

| Ingredient: | Weight, mg. |
|---|---|
| Tris(hydroxymethyl)aminomethane | 18 |
| Starch | 2 |
| Sodium β- or α-naphthyl phosphate | 0.2 |
| Polyoxyethylene glycol | 2.8 |
| Magnesium sulphate | 0.05 |

The tablets were of a weight varying from 22-25 mg.

EXAMPLE 22

Tablets were prepared containing the ingredient shown in Table 5.

Table 5

| Ingredient: | Weight, mg. |
|---|---|
| Sodium fumarate | 10 |
| Starch | 1 |
| Sodium β- or α-naphthyl phosphate | 0.2 |
| Polyoxyethylene glycol | 1 |

The tablets were of a weight varying from 12-14 mg.

EXAMPLE 23

Into a suitable test tube were introduced a tablet prepared according to Example 21 and two drops of water. The tablet disintegrated in 10-15 seconds resulting in a turbid solution. A 0.1 ml. quantity of suspect pathologic serum to be analyzed was then added to the solution in the test tube and the tube shaken. After 10 minutes incubation at a temperature of 37° C., one drop of 10% orthophosphoric acid solution was added.

The lower end of a three-zoned test strip prepared according to Example 16 was dipped into the above solution and after 5 minutes the developed color was observed to be a purple-red. All three reactive zones had been invaded by the color indicating that the serum had a value of phosphates activity of the highest level for which the three-zoned test strip was designed, that is, a pathologic value. A normal serum treated as above gave color only to the first of the three reactive zones. If an unknown serum were to give color to the first and second reactive zones, it would be considered as borderline.

EXAMPLE 24

The lower end of a continuous strip prepared according to Example 17 was introduced into the test solution of Example 23. Five minutes later the extension of colored area was observed and the number corresponding to the highest level of colored area on the calibrated strip was recorded. Figures from 1-3 indicated a normal value, from 3-5 a borderline value and higher figures indicated pathologic values.

EXAMPLE 25

Into a test tube were introduced a tablet prepared according to Example 21 and 3 drops of milk to be assayed. After 10 minutes the lower end of a one-zone test strip prepared according to Example 17 was dipped into the resulting solution. Five minutes later the concentration of phosphatase in the milk was read based on the color development of the strip. Color development in adequately pasteurized milk, for example, should be limited to the figure 1 of the scale. Higher values indicate an inadequate pasteurization or the presence of adulterating raw milk.

EXAMPLE 26

A three-zone strip prepared according to Example 18 was moistened at the end part containing the substrate with 0.05 ml. of the serum to be assayed. After 10 minutes the strip was washed with water so that the liberated naphthol reached the chromogen zones. Five minutes later the concentration of phosphatase in the serum was read as described in Example 23.

EXAMPLE 27

A one-zone strip prepared according to Example 18 was moistened at the end part containing the substrate with 0.05 ml. of the milk to be assayed. After 10 minutes the strip was washed with water so that the liberated naphthol reached the chromogen zone. Five minutes later the concentration of phosphatase in the milk was read as described in Example 25.

EXAMPLE 28

Amberlite CG 50 carboxylic cation exchange resin was washed successively with portions of 1 N aqueous sodium hydroxide and 1 N aqueous hydrochloric acid to remove impurities. The washed resin was then dried at 50° C. A 20 g. portion of the dried resin was placed into a 250 ml. three-necked, round bottomed flask, fitted with a stirrer, condenser and thermometer. An 80 ml. portion of thionyl chloride was added and the mixture was heated to reflux in an oil bath maintained at 90° C. for 6 hours. The resulting suspension was filtered and the solid obtained was washed twice with 100 ml. portions of anhydrous carbon tetrachloride. The washed solid was then dried in a vacuum desiccator. The resulting product contained 0.9 meq. chlorine per gram of resin.

The above chlorinated resin was mixed with 27 millimoles of o-dianisidine hydrochloride in 100 ml. of anhydrous toluene containing 20 percent (weight/volume basis) of triethylamine. The resulting suspension was heated to 80° C. and stirred for 3 hours. The suspension was then filtered and the solid was washed three times with 150 ml. portions of 5 N sodium hydroxide in methyl alcohol. The amidated resin was then purified by washing in a column first with 100 ml. methanol, then with 100 ml. of 2 N hydrochloric acid and finally with water until neutral.

A 5 gram portion of the above amidated resin was mixed in 25 ml. of water with 1.5 ml. of 37 weight percent hydrochloric acid. This suspension was cooled to 0–5° C. and 0.5 ml. of 5 N sodium nitrite was added dropwise. The reaction mixture was then stirred for 1 hour. The mixture was then filtered and the diazo resin was washed with water and acidulated with hydrochloric acid. The resin was then dried in a vacuum desiccator. The resin product had a coupling power of 28.6 measured by Method A.

EXAMPLE 29

Amberlite IRC 50 carboxylic cation exchange resin was washed and purified as described above. This resin was then treated with thionyl chloride at 90° C. for 5 hours to form a chlorinated resin which contained 0.8 meq. chlorine per gram of resin.

This chlorinated resin was then reacted with o-dianisidine hydrochloride and diazotised as described above to form a resin product having a coupling power of 17.5 measured by Method A.

EXAMPLE 30

A 1 kg. portion of Amberlite IRC–84 carboxylic cation exchange resin was dispersed in 10 liters of methanol and then 1 liter of 40 weight percent aqueous sodium hydroxide solution was added. The resulting alkaline suspension was stirred for one hour and filtered. The resulting resin sodium salt was washed with methanol until the effluent was colorless and neutral. The resin was then washed with water to remove the methanol. The washed resin sodium salt was then stirred into 5 liters of 2 N hydrochloric acid. The acid form of the resin was then filtered off and was washed with water until the effluent was neutral. The resin was then dried at 80° C. in an oven. The dried resin was then milled in a mechanical mortar to a particle size of about 14–19 microns in diameter. The moisture content of the resin was then measured by drying the resin at 80° C. and then drying a weighed amount of the resin to constant weight over phosphorus pentoxide under vacuum. The loss in weight is the residual water content of the resin.

A 50 g. portion of the above milled resin was stirred for 14 hours at room temperature in 200 ml. of benzene containing sufficient water which when added to the above-determined residual water content totaled 0.3 ml. per gram of resin. Under stirring, 200 ml. of thionyl chloride was added dropwise in about 10 min. to the above resin dispersion. When all the thionyl chloride was added, the flask containing the resin was immersed in an oil bath at 80° C. Stirring and heating at 80° C. was continued for 6 hours. The resin was then filtered off and washed with three 100 ml. portions of benzene and then maintained under vacuum until it was free of thionyl chloride. The resulting chlorinated resin contained 2.37 meq. chlorine per gram of resin.

A dispersion of 71 millimoles of 2-chloro-1,4-diaminobenzene sulfate in 200 ml. anhydrous dimethylformamide was heated at 80° C. To this were added 342 millimoles of anhydrous triethylamine dropwise over a 10 min. period. A 20 g. portion of the above chlorinated resin was added to the above dispersion and heated with stirring at 80° C. for 6 hours. The resin was then filtered off and mixed with 200 ml. methanol to which 100 ml. of 4 N hydrochloric acid was added with stirring. The resin was then removed and washed with water until neutral.

A 5 g. portion of the above amidated resin was mixed in 25 ml. water with 2 ml. of 37 weight percent hydrochloric acid. This suspension was cooled to 2–4° C. and 2 ml. of 5 N sodium nitrite was added dropwise. The reaction mixture was then stirred for 5 min. The resin was filtered off, it was washed with three 10 ml. portions of cold 0.01 N hydrochloric acid and dried in a vacuum desiccator over phosphorus pentoxide. The insoluble chromogen resin product had a coupling power of 220 measured by Method B.

The above resin product was incorporated in a strip of bibulous material. A 0.1 ml. portion of an aqueous solution of 0.2 M sodium aspartate, 0.1 M alpha-ketoglutarate and 0.1 M phosphate buffer at pH 7.4 was placed in a test tube. To this was added 0.2 ml. of a test serum containing glutamic oxalacetic transaminase. This mixture was maintained at 37° C. for 20–30 min. The above strip was then immersed in the reaction solution for 2 min. The portion of the strip containing the insoluble chromogen resin product turned orange-red indicating reaction between the chromogen and the oxalacetic acid liberated by the transaminase from the sodium aspartate-alpha-ketoglutarate substrate.

EXAMPLE 31

The above procedure was repeated using Amberlite XE–222 carboxylic cation exchange resin to produce an insoluble chromogen product having a coupling power of 194 measured by Method B. This resin product is also useful in a test for glutamic-oxalacetic transaminase.

What is claimed is:

1. An insoluble polymeric diazonium salt chromogen having a coupling power from 4.25 to about 350 milligrams of naphthol per gram of chromogen as measured by Method A or Method B of the above specification consisting essentially of an insoluble cation exchange polymeric resin having reactive groups selected from the class consisting of carboxylic acid groups, potassium salts of such acid groups, and sodium salts of such acid groups attached to the resin and wherein a sufficient amount of the reactive groups are each individually bonded through an acyl-amide linkage to the diazotized form of a carbocyclic aromatic diamine moiety derived from a compound selected from the class consisting of benzidine, o-tolidine, o-dianisidine, phenylenediamine and 2-chloro-1,4-diaminobenzene to achieve such coupling power.

2. A chromogen according to claim 1 wherein the cation exchange resin contains carboxylic acid groups.

3. A chromogen according to claim 1 wherein the cation exchange resin contains sodium salts of carboxylic acid groups.

4. A chromogen according to claim 1 having a coupling power, as measured by Method A or Method B of the above specification, of from about 25 to about 45 milligrams of naphthol per gram of chromogen.

5. A chromogen according to claim 1 having a coupling power, as measured by Method A or Method B of the above specification, of from about 190 to about 350 milligrams of naphthol per gram of chromogen.

6. A process for the preparation of an insoluble polymeric diazonium salt chromogen according to claim 1 which comprises reacting an insoluble cation exchange resin having reactive groups selected from the class consisting of carboxylic acid groups, potassium salts of such acid groups, and sodium salts of such acid groups attached to the resin with a halogenating agent to form acyl halide groups containing from 0.2 to 2.37 milliequivalents of acyl halide per gram of resin, reacting the resulting acyl halide groups with a carbocyclic aromatic diamine selected from the class consisting of benzidine, o-tolidine, o-dianisidine, phenlenediamine, and 2-chloro-1,4-diaminobenzene to form a resin having a sufficient amount of the reactive groups attached thereto each individually bonded through an acyl-amide linkage to a carbocyclic aromatic diamine moiety derived from a compound selected from the class consisting of benzidine, o-tolidine, o-dianisidine, phenylenediamine, and 2-chloro-1,4-diaminobenzene, said moiety having a free amino group, to subsequently achieve a coupling power from 4.25 to about 350 milligrams of naphthol per gram of chromogen as measured by Method A or Method B of the above specification, and diazotizing the free amino group of each said moiety to produce the insoluble polymeric diazonium salt chromogen having the above coupling power.

7. A process according to claim 6 wherein the resin is treated with water to achieve a water content from 0.04 to 0.3 milliliter per gram of resin prior to reacting said resin with a halogenating agent.

References Cited

UNITED STATES PATENTS

| 2,274,551 | 2/1942 | Kenyon et al. | 260—93.5 R |
| 2,906,715 | 9/1959 | Hagge et al. | 260—2.1 E |
| 3,230,087 | 1/1966 | Sus et al. | 260—141 R |

OTHER REFERENCES

Chemisches Zentralblatt, Jarrg, 128, S11715 (1957).

Hackh's Chemical Dictionary, fourth edition, 1969, p. 16.

HAROLD D. ANDERSON, Primary Examiner

U.S. Cl. X.R.

23—230 M; 195—103.5 R